(12) United States Patent
Nanno et al.

(10) Patent No.: US 8,583,635 B1
(45) Date of Patent: *Nov. 12, 2013

(54) KEYWORDS ASSOCIATED WITH DOCUMENT CATEGORIES

(75) Inventors: Tomoyuki Nanno, Tokyo (JP); Michael Riley, New York, NY (US); Gaku Ueda, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,302

(22) Filed: Jul. 26, 2011

Related U.S. Application Data

(63) Continuation of application No. 11/864,325, filed on Sep. 28, 2007, now Pat. No. 7,996,393.

(60) Provisional application No. 60/827,609, filed on Sep. 29, 2006.

(51) Int. Cl.
*G06F 7/00* (2006.01)

(52) U.S. Cl.
USPC .......................................................... 707/723

(58) Field of Classification Search
USPC .......................... 707/723, 748, 728, 727, 718
See application file for complete search history.

(56) References Cited

U.S. PATENT DOCUMENTS

| | | | | |
|---|---|---|---|---|
| 5,488,725 A * | 1/1996 | Turtle et al. ........................... | 1/1 |
| 5,787,421 A * | 7/1998 | Nomiyama ........................... | 1/1 |
| 5,940,821 A * | 8/1999 | Wical .................................... | 1/1 |
| 5,953,718 A * | 9/1999 | Wical .................................... | 1/1 |
| 6,167,397 A | 12/2000 | Jacobson et al. | |
| 7,386,544 B2 | 6/2008 | Chou | |
| 7,424,469 B2 * | 9/2008 | Ratnaparkhi ........................ | 1/1 |
| 2002/0072895 A1 | 6/2002 | Imanaka et al. | |
| 2002/0099700 A1 * | 7/2002 | Li ..................................... | 707/5 |
| 2003/0037050 A1 * | 2/2003 | Monteverde ....................... | 707/6 |
| 2003/0088553 A1 * | 5/2003 | Monteverde ....................... | 707/3 |
| 2003/0220909 A1 | 11/2003 | Farrett | |
| 2004/0002973 A1 * | 1/2004 | Chaudhuri et al. ................ | 707/7 |
| 2005/0071365 A1 | 3/2005 | Hou et al. | |
| 2005/0097092 A1 * | 5/2005 | Annau et al. ...................... | 707/3 |
| 2005/0222981 A1 * | 10/2005 | Lawrence et al. ................. | 707/3 |
| 2005/0234953 A1 | 10/2005 | Zhang et al. | |
| 2006/0047649 A1 | 3/2006 | Liang | |
| 2006/0212441 A1 | 9/2006 | Tang et al. | |
| 2007/0016491 A1 | 1/2007 | Wang et al. | |
| 2007/0038608 A1 | 2/2007 | Chen | |
| 2007/0050355 A1 | 3/2007 | Kim | |
| 2007/0073748 A1 | 3/2007 | Barney | |
| 2007/0112764 A1 | 5/2007 | Yih et al. | |
| 2007/0276857 A1 | 11/2007 | Fujio et al. | |
| 2008/0195595 A1 | 8/2008 | Masuyama et al. | |
| 2009/0024612 A1 | 1/2009 | Tang et al. | |

OTHER PUBLICATIONS

Co-pending U.S. Appl. No. 11/864,325, filed Sep. 28, 2007 entitled "Keywords Associated with Document Categories" by Tomoyuki Nanno et al., 47 pages.

* cited by examiner

*Primary Examiner* — Mohammed R Uddin
(74) *Attorney, Agent, or Firm* — Harrity & Harrity, LLP

(57) ABSTRACT

A system extracts a pair that includes a keyword candidate and information associated with a document from multiple documents, and calculates a frequency that the keyword candidate appears in search queries and a frequency that the pair appears in the multiple documents. The system also determines whether the keyword candidate is a keyword for a category based on the calculated frequencies, and associates the keyword with the document if the keyword candidate is the keyword for the category.

23 Claims, 10 Drawing Sheets

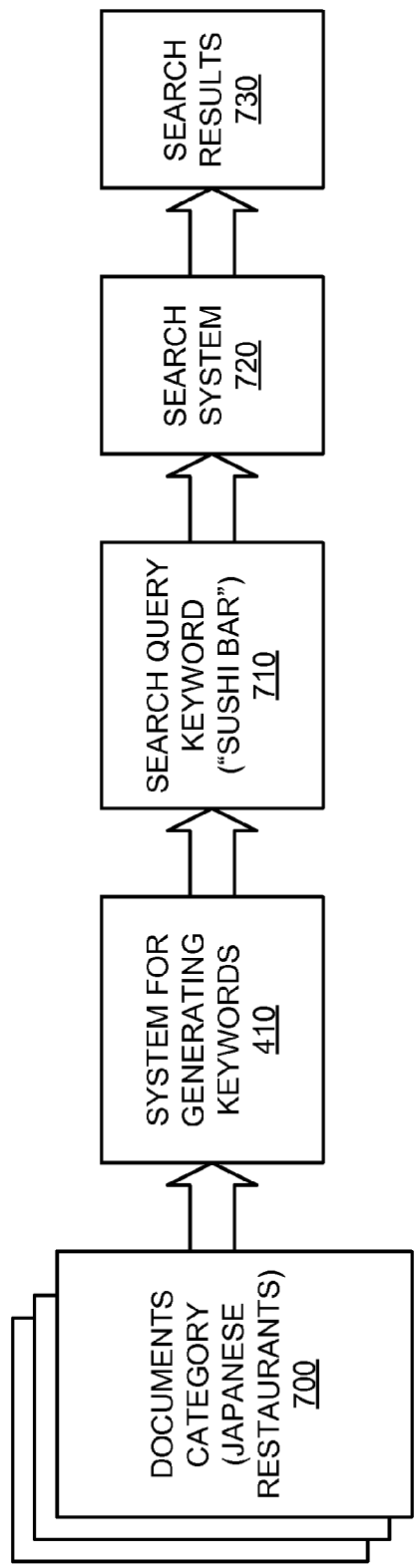

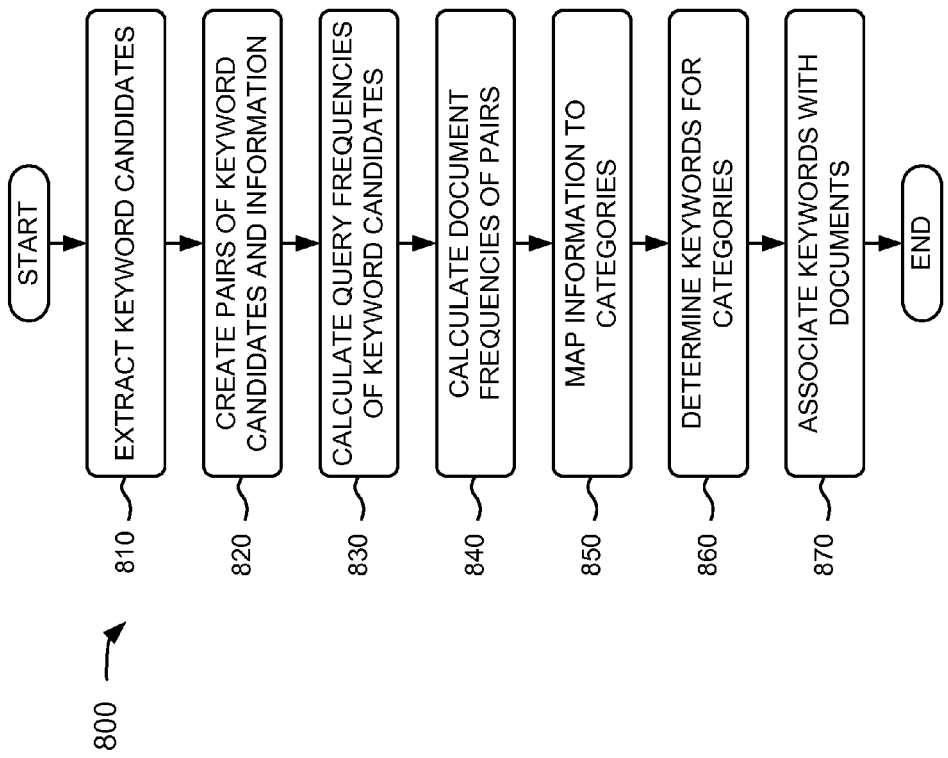

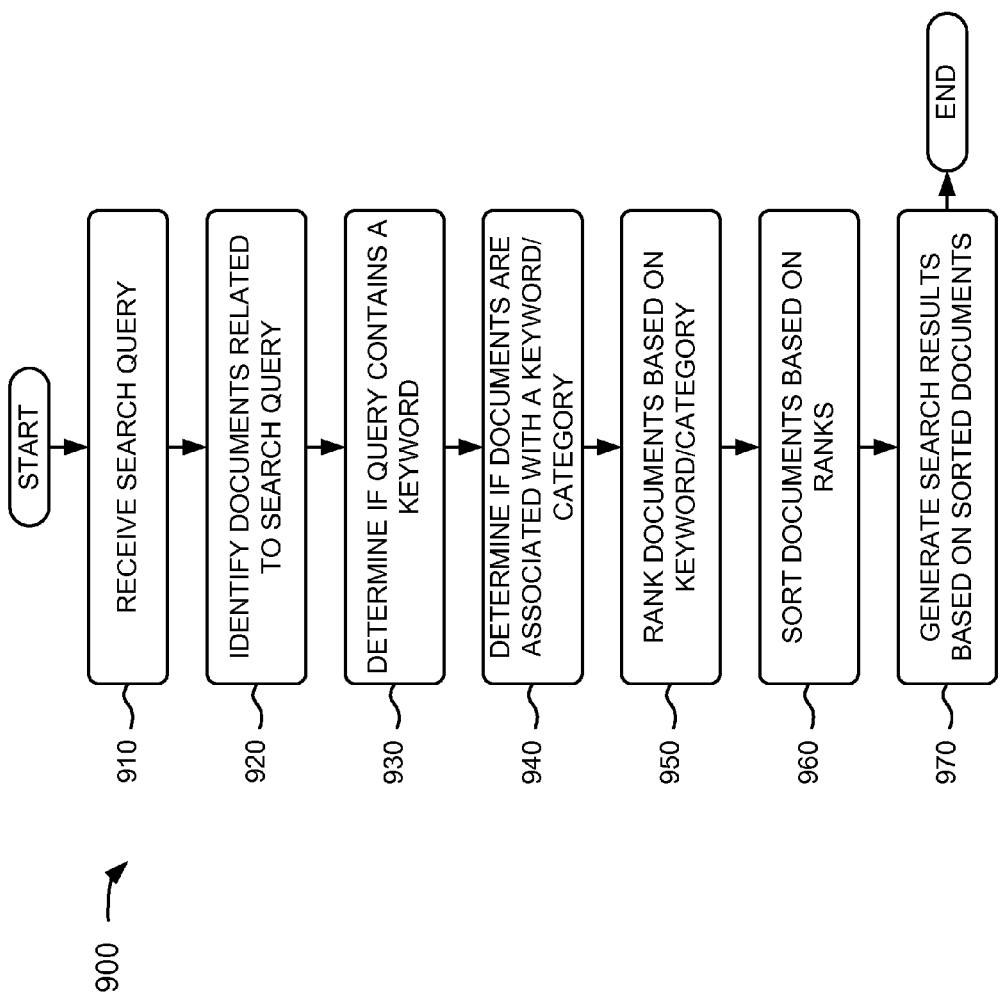

KEYWORDS ASSOCIATED WITH DOCUMENT CATEGORIES

RELATED APPLICATION

This application is a continuation of U.S. patent application Ser. No. 11/864,325, filed Sep. 28, 2007, which claims priority under 35 U.S.C. §119 based on U.S. Provisional Application No. 60/827,609, filed Sep. 29, 2006, the disclosures of which are incorporated by reference herein in their entirety.

BACKGROUND

The World Wide Web ("web") contains a vast amount of information. Search engines assist users in locating desired portions of this information by cataloging web documents. Typically, in response to a user's request, a search engine returns links to documents relevant to the request.

Search engines may base their determination of the user's interest on a search query provided by the user. A search query is a request for information, where the request may specify one or more search terms. The goal of a search engine is to identify links to relevant search results based on the search query. Typically, the search engine accomplishes this by matching the terms in the search query to a corpus of pre-stored web documents. Web documents that contain the user's search terms are considered "hits" and are returned to the user.

The quality of the plurality of documents returned to the user depends on the quality of the ranking process used to rank the search results. For example, some ranking processes rank documents based on the number of links pointing to them, the ranks of the plurality of documents pointing to them, or the anchor text associated with the links pointing to them.

The categorization of documents is known. For example, in the context of web pages, one may categorize a web page known to be about a Japanese restaurant to a "Restaurant-Japanese" category. A user searching for a Japanese restaurant can select this category to aid the search. Currently, the categorization of documents is not particularly useful to search engines.

SUMMARY

According to one aspect, a computing device-implemented method may include extracting a keyword candidate from at least one document from multiple documents, creating a pair that includes the keyword candidate and information associated with the at least one document, calculating a frequency that the keyword candidate appears in search queries, calculating a frequency that the pair appears in the multiple documents, correlating the information associated with the at least one document with a category, determining whether the keyword candidate is a keyword for the category based on the calculated frequencies, and, if the keyword candidate is the keyword for the category, associating the keyword with the at least one document.

According to another aspect, a system may include means for extracting a pair that includes a keyword candidate and information associated with at least one document from multiple documents, means for calculating a frequency that the keyword candidate appears in search queries and a frequency that the pair appears in the multiple documents, means for determining whether the keyword candidate is a keyword for a category based on the calculated frequencies, and means for associating the keyword with the at least one document if the keyword candidate is the keyword for the category.

According to yet another aspect, a system may include a memory to store a plurality of instructions, and a processor to execute instructions in the memory to extract a pair that includes a keyword candidate and information associated with at least one document from multiple documents, calculate a frequency that the keyword candidate appears in search queries and a frequency that the pair appears in the multiple documents, determine whether the keyword candidate is a keyword for a category based on the calculated frequencies, and associate the keyword with the at least one document if the keyword candidate is the keyword for the category.

According to a further aspect, a method may include receiving a search query that contains a keyword, identifying multiple documents related to the search query, extracting a keyword candidate from at least one document of the multiple documents, creating a pair that includes the keyword candidate and information associated with the at least one document, calculating a frequency that the keyword candidate appears in search queries, calculating a frequency that the pair appears in the multiple documents, correlating the information associated with the at least one document with a category, determining whether the keyword candidate is a keyword for the category based on the calculated frequencies, determining ranks of the multiple documents based on the keyword and the category, sorting the multiple documents based on the ranks, and generating search results based on the sorted multiple documents.

According to another aspect, a system may be implemented within one or more computer devices, and may include a keyword candidate extractor that extracts a keyword candidate from at least one document from multiple documents, a pair creator that creates a first pair that includes the keyword candidate and information associated with the at least one document, a frequency calculator that calculates a frequency that the keyword candidate appears in search queries, and calculates a frequency that the pair appears in the multiple documents, an information-to-category mapper that correlates the information associated with the at least one document with a category, and creates a second pair that includes the keyword candidate and the category, a count accumulator that calculates a frequency that the second pair appears in the multiple documents, a keyword/category calculator that determines whether the keyword candidate is a keyword for the category based on the calculated frequencies, and a keyword/category associator that associates the keyword with the at least one document if the keyword candidate is the keyword for the category.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 7A is a functional block diagram of a system for generating search results based on keywords associated with document categories;

FIG. 8 is a flowchart of an exemplary process for generating keywords associated with document categories; and FIG. 9 is a flowchart of an exemplary process for presenting search results based on associated keywords and categories.

DETAILED DESCRIPTION

The following detailed description of the invention refers to the accompanying drawings. The same reference numbers in different drawings may identify the same or similar elements. Also, the following detailed description does not limit the invention.

Overview

Figure 1:
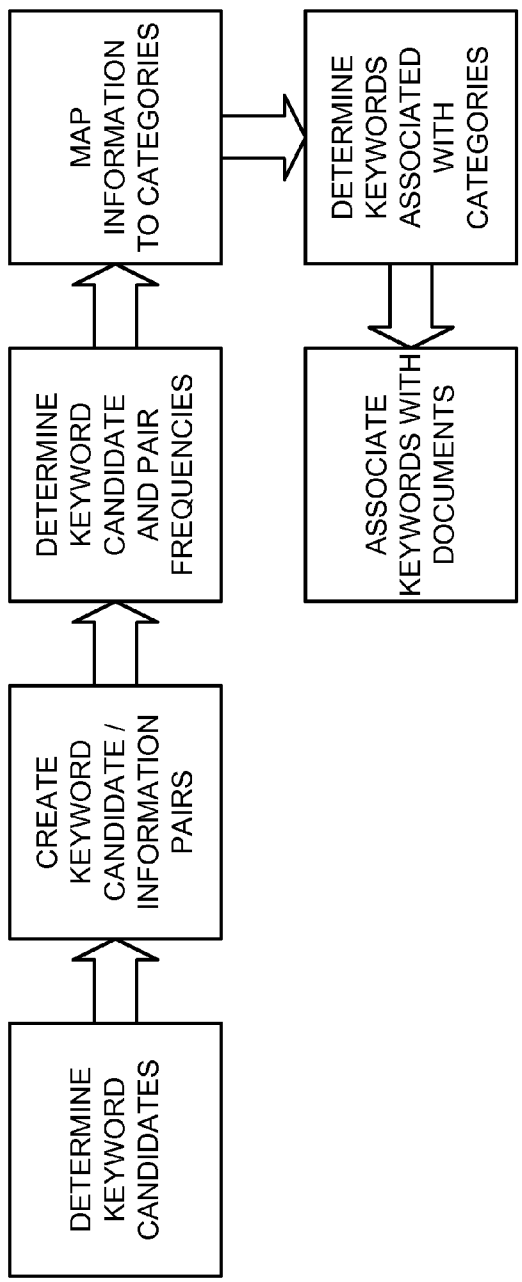
FIG. 1 is a diagram of an overview of an exemplary implementation described herein.

Implementations described herein may provide a system for generating keywords associated with document categories. For example, as shown in FIG. 1, a system for generating keywords associated with document categories may determine keyword candidates from a corpus of documents. In one implementation, the keyword candidates may be words or phrases used in previous search queries and may be found in documents associated with particular document information. The system may create keyword candidates and document information pairs from the determined keyword candidates. The frequencies of the keyword candidates and the created pairs may be determined by the system. In one implementation, the number of times a keyword candidate appears in search queries may be determined for each keyword candidate. In another implementation, the number of times a keyword candidate and document information pair appears in the corpus of documents may be determined for each pair.

As further shown in FIG. 1, the system may map the document information to document categories to create pairs of keyword candidates and document categories. The system may determine keywords associated with document categories based on the keyword candidates. The system may associate each identified keyword with documents in which it is located, and/or with other documents that contain the keyword and the document category associated with the keyword.

A "document," as the term is used herein, is to be broadly interpreted to include any machine-readable and machine-storable work product. A document may include, for example, an e-mail, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.).

A "link," as the term is used herein, is to be broadly interpreted to include any reference to/from a document from/to another document or another part of the same document.

"Document information," as the term is used herein, is to be broadly interpreted to include any textual information included in a document, embedded information (such as meta information, images, hyperlinks, etc.) included in a document, and/or embedded instructions (such as Javascript, etc.) included in a document.

A "keyword" or "keyword candidate," as those terms are used herein are to be broadly interpreted to include any word or phrase that is used in search queries (e.g., previous search queries provided in a repository), is found in a document associated with particular document information (e.g., a business listing), etc.

A "category," as the term is used herein, is to be broadly interpreted to include any of several fundamental and distinct classes to which concepts belong. A category may include, for example, art-related categories (e.g., literature, movies, music, etc.), business-related categories (e.g., arts and entertainment, business services, industrial goods and services, etc.), computer-related categories (e.g., Internet, hardware, programming, software, etc.), game-related categories (e.g., computer games, online games, role playing, etc.), health-related categories (e.g., conditions and diseases, medicine, pharmacy, etc.), home-related categories (e.g., cooking, family, gardening, etc.), kids and teens-related categories (e.g., international, people and society, school, etc.), news-related categories (e.g., media, newspapers, online archives, etc.), recreation-related categories (e.g., automobiles, outdoors, pets, etc.), reference-related categories (e.g., biography, education, museums, etc.), regional-related categories (e.g., Europe, North America, etc.), science-related categories (e.g., biology, social sciences, technology, etc.), shopping-related categories (e.g., crafts, home and garden, sports, etc.), society-related categories (e.g., issues, law, religion, etc.), sports-related categories (e.g., basketball, football, baseball, etc.), language-related categories (e.g., English, French, German, etc.), web activity-related categories (e.g., high, medium, low, etc.), etc.

A category may be provided by a document, may be determined from information contained in a document, and/or may be found by a combination of the aforementioned techniques.

Although exemplary implementations described below relate to business keywords and categories, in other implementations, any of the above-referenced categories and keywords related to such categories may be used.

Exemplary Network

Figure 2:
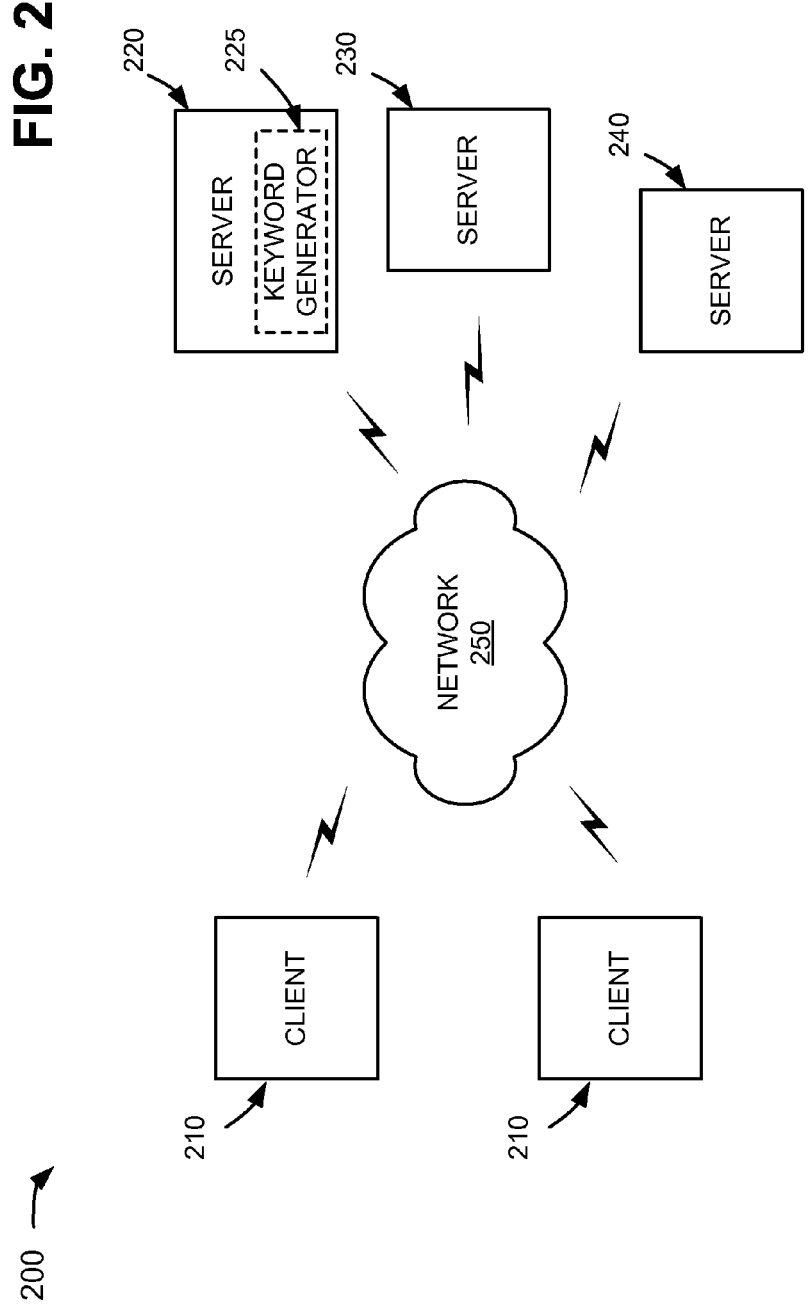
FIG. 2 is a diagram of an exemplary network in which systems and methods described herein may be implemented.

FIG. 2 is an exemplary diagram of a network 200 in which systems and methods described herein may be implemented. Network 200 may include multiple clients 210 connected to multiple servers 220-240 via a network 250. Network 250 may include a local area network (LAN), a wide area network (WAN), a telephone network, such as the Public Switched Telephone Network (PSTN), an intranet, the Internet, or a combination of networks. Two clients 210 and three servers 220-240 have been illustrated as connected to network 250 for simplicity. In practice, there may be more or fewer clients and servers. Also, in some instances, a client may perform one or more functions of a server and/or a server may perform one or more functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents. Clients 210 and servers 220-240 may connect to network 250 via wired, wireless, and/or optical connections.

Server 220 may include a keyword generator 225. Alternatively, or additionally, server 220 may include a search engine, useable by clients 210. Server 220 may crawl a corpus of documents (e.g., web pages), index the documents, and store information associated with the documents in a repository of crawled documents. Servers 230 and 240 may store or maintain documents that may be crawled by server 220. While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Exemplary Client/Server Architecture

Figure 3:
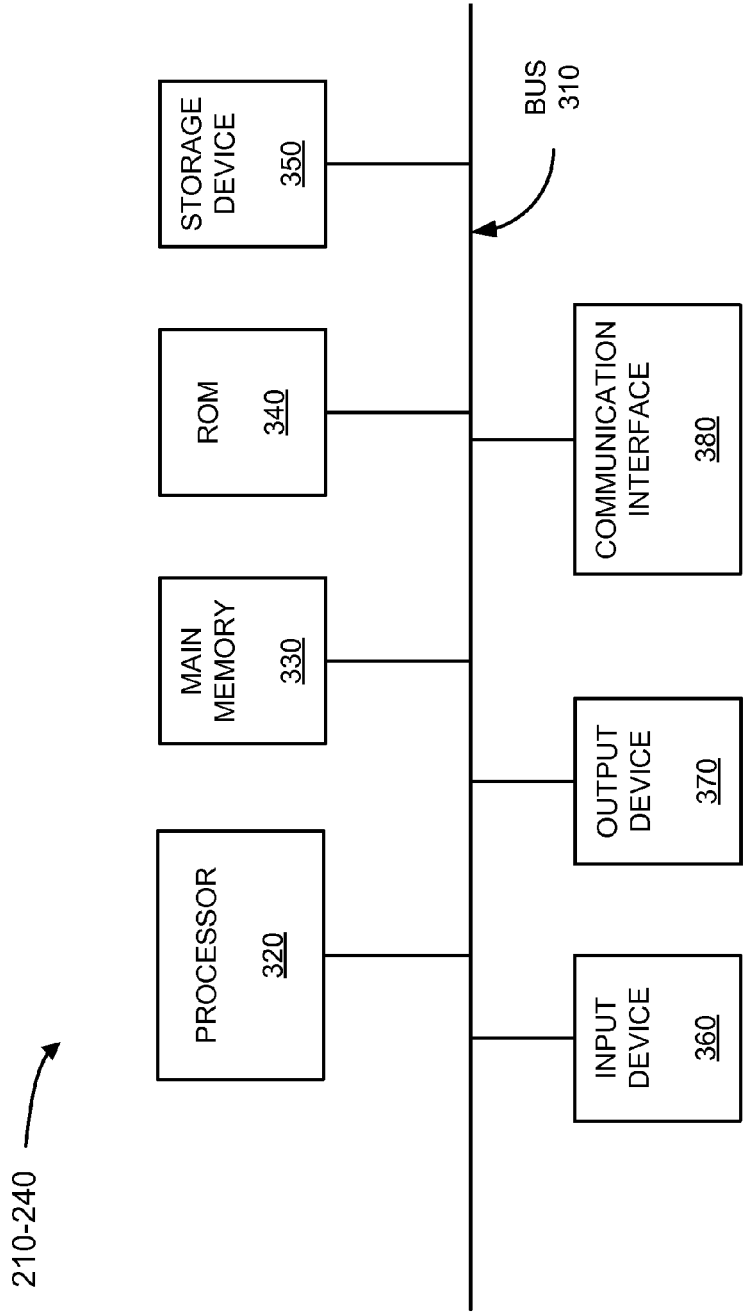
FIG. 3 is a diagram of an exemplary client or server of the exemplary network of FIG. 2.

FIG. 3 is an exemplary diagram of a client or server entity (hereinafter called "client/server entity"), which may correspond to one or more of clients 210 and servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity may perform certain keyword-related, document ranking-related, and/or searching-related operations. The client/server entity may perform these operations in response to processor 320 executing software instructions contained in a computer-readable medium, such as memory 330. A computer-readable medium may be defined as a physical or logical memory device.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary System for Generating Keywords Associated with Document Categories

Figure 4:
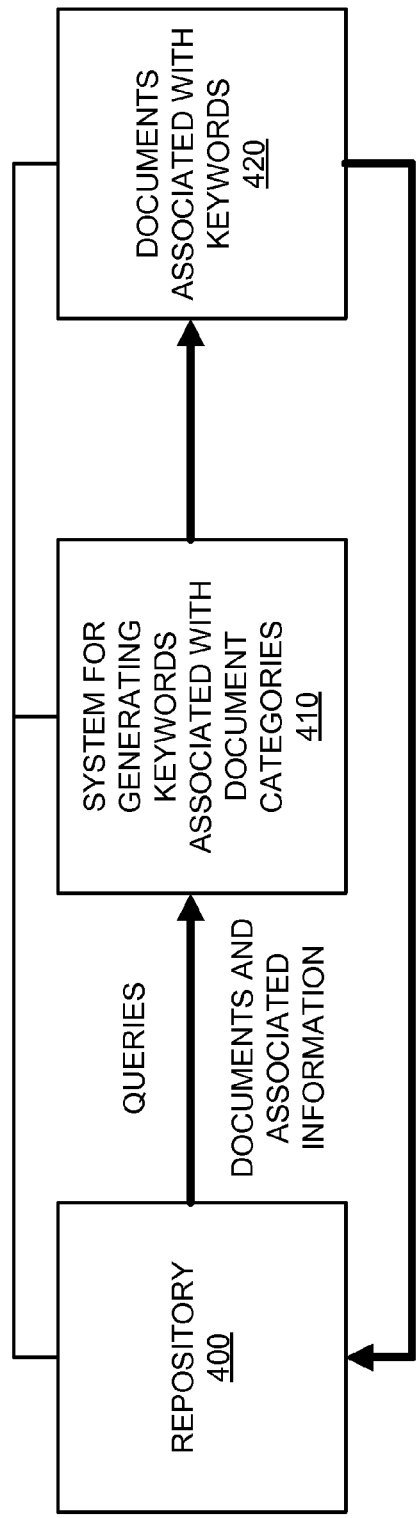
FIG. 4 is a functional block diagram that includes an exemplary system for generating keywords associated with documents categories.

FIG. 4 is a functional block diagram that includes a repository 400 of documents, an exemplary system for generating keywords associated with documents categories 410, and documents associated with keywords 420. According to one implementation, one or more of the functions described below may be performed by server 220 or a portion of server 220. According to another implementation, one or more of these functions may be performed by an entity separate from server 220, such as a computer associated with server 220 or one of servers 230 or 240.

System 410 may connect to repository 400, and may generate documents associated with keywords 420. System 410 may use search queries, documents, and associated document information provided in repository 400 to determine keywords associated with document categories. System 410 may associate the keywords with documents (e.g., provided in repository 400) to create documents associated with the keywords 420. In one implementation, documents 420 may be provided to repository 400 for storage.

Repository 400 may include a physical or logical memory device (e.g., main memory 330, ROM 340, storage device 350, etc.) that stores information associated with documents that were crawled and indexed by, for example, server 220 (FIG. 2) or an entity separate from server 220. For example, repository 400 may implement a linked database that stores documents, and/or information associated with documents. In one implementation, the associated document information may include a business listing (e.g., a name, address, and/or telephone number of a business).

Repository 400 may also store user behavior data associated with documents. The user behavior data may include, for example, information concerning users who accessed the documents, such as navigational actions (e.g., what links the users selected (e.g., topics and/or categories), how many times a link(s) is selected, addresses entered by the users, forms completed by the users, etc.), the language of the users, interests of the users, query terms entered by the users, etc. In another implementation, the user behavior data may be stored external to repository 400 and provided as an input to system 410.

The user behavior data may be obtained from a web browser or a browser assistant associated with clients 210. A browser assistant may include executable code, such as a plug-in, an applet, a dynamic link library (DLL), or a similar type of executable object or process that operates in conjunction with (or separately from) a web browser. In one implementation, the browser assistant may take the form of an add-on toolbar. The web browser or browser assistant may send information to server 220 concerning a user of a client 210.

For example, the web browser or browser assistant may record data concerning the documents accessed by the user and the links within the documents (if any) the user selected. Additionally, or alternatively, the web browser or browser assistant may record data concerning the language of the user, which may be determined in a number of ways that are known in the art, such as by analyzing documents accessed by the user. Additionally, or alternatively, the web browser or browser assistant may record data concerning interests of the user, which may be determined, for example, from the favorites or bookmark list of the user, topics associated with documents accessed by the user, or in other ways. Additionally, or alternatively, the web browser or browser assistant may record data concerning query terms entered by the user. The web browser or browser assistant may send this data for storage in repository 400.

Figure 5:
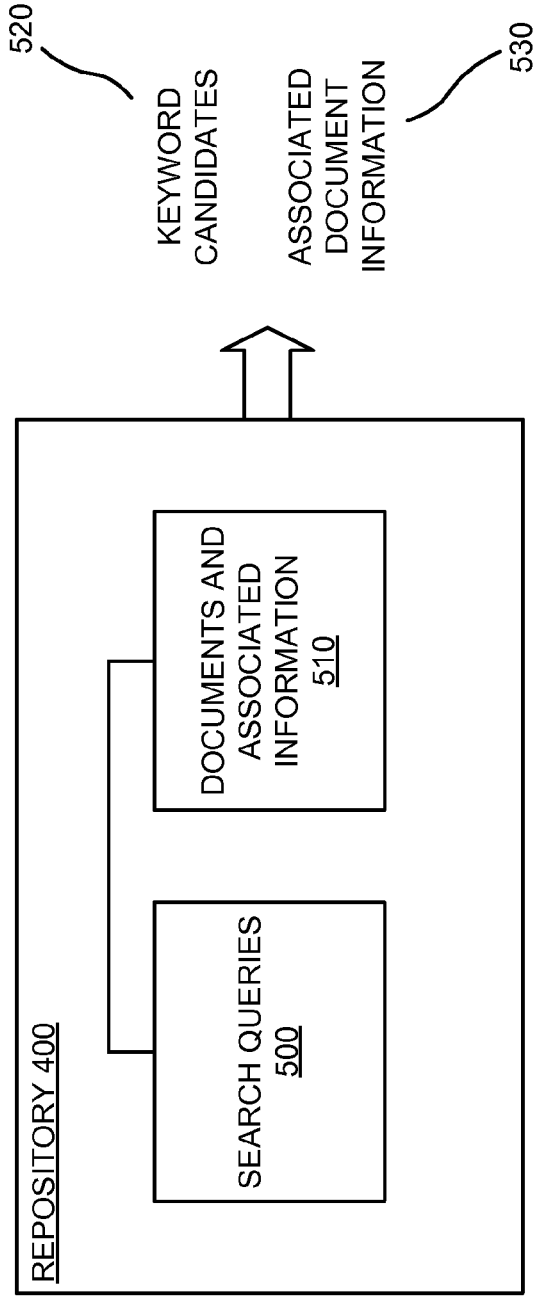
FIG. 5 is a block diagram of a repository of FIG. 4 that includes search queries and documents with associated information.

FIG. 5 is a block diagram showing exemplary information provided in repository 400. As shown, in one implementation, repository 400 may include search queries 500 and documents with associated information 510. For example, search queries 500 may include local search queries (e.g., queries from local search systems that attempt to return relevant web pages and/or business listings within a specific geographic area). In another example, documents with associated information 510 may include business listings (e.g., the name, address, and/or telephone number of a business in a document) related to local search documents. As described below, system 410 may extract keyword candidates 520 and associated document information 530 from repository 400, and may use keyword candidates 520 and associated document information 530 to generate keywords associated with document categories.

Although FIG. 5 shows exemplary information that may be provided in repository 400, in other implementations, more, less, or different information may be provided in repository 400.

Figure 6:
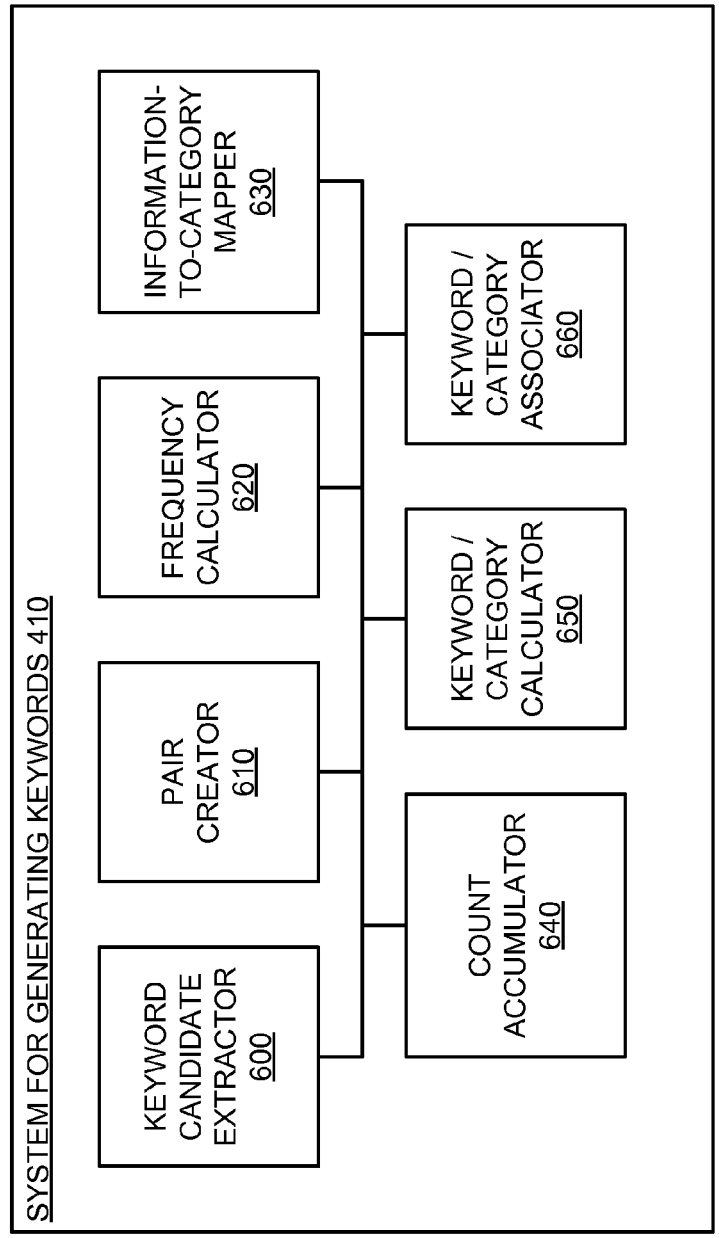
FIG. 6 is a functional block diagram of the components of the system for generating keywords associated with documents categories shown in FIG. 4.

FIG. 6 is a functional block diagram of the components of keyword generating system 410. As shown, keyword generating system 410 may include a keyword candidate extractor 600, a pair creator 610, a frequency calculator 620, an information-to-category mapper 630, a count accumulator 640, a keyword/category calculator 650, and a keyword/category associator 660. Although FIG. 6 shows exemplary tasks performed by keyword generating system 410, in other implementations, keyword generating system 410 may perform additional or different tasks that may be used to identify keywords.

Keyword candidate extractor 600 may extract keyword candidates (e.g., keyword candidates 520) from documents in repository 400 based on search queries 500 and associated information 510. For example, in one implementation, a keyword candidate may include a word or phrase used in a local search query (e.g., stored in repository 400), and found in one or more documents associated with a particular business listing (e.g., the name, address, and/or telephone number of the business in a document).

Pair creator 610 may create pairs of keyword candidates and associated document information, where each pair may include a keyword candidate and corresponding document information. For example, in one implementation, pair creator 610 may create a pair that includes a keyword candidate (e.g., "law offices") and its associated document information (e.g., for a business listing, "Law Offices of Jane Doe LLP").

Frequency calculator 620 may calculate the frequency that each keyword candidate occurs in search queries stored in repository 400. For example, in one implementation, frequency calculator 620 may calculate the number of times (i.e., the frequency) that "law offices" appears in search queries stored in repository 400. Frequency calculator 620 may also calculate the frequency that each keyword candidate and document information pair occurs in documents stored in repository 400. For example, in one implementation, frequency calculator 620 may determine the number of times a keyword candidate (e.g., "law offices") and its associated document information (e.g., "Law Offices of Jane Doe LLP") appears in documents stored in repository 400.

Information-to-category mapper 630 may map (or correlate) document information with document categories. Document categories may be obtained from third party providers and/or from other sources. For example, in one implementation, mapper 630 may correlate document information (e.g., "Law Offices of Jane Doe LLP") with a document category (e.g., "attorneys"). Information-to-category mapper 630 may create pairs of keyword candidates and document categories, where each pair may include a keyword candidate and its corresponding document category. For example, in one implementation, mapper 630 may create a pair that includes "law offices" (a keyword candidate) and "attorneys" (a document category).

Count accumulator 640 may accumulate the counts for each keyword candidate and document category pair by calculating the frequency that each keyword candidate and document category pair occurs together in documents stored in repository 400. For example, in one implementation, count accumulator 640 may determine the number of times a keyword candidate (e.g., "law offices") and its associated document category (e.g., "attorneys") appears in documents stored in repository 400.

Keyword/category calculator 650 may perform statistical analyses on the counts determined by count accumulator 640 to determine whether a keyword candidate may have a strong "within" category correlation, may have a weak "between" category correlation, and/or may represent a significant search query term. For example, in one implementation, a count exceeding a particular "within" threshold may indicate that the keyword candidate has a strong "within" category correlation. In another implementation, a count below a particular "between" threshold may indicate a weak "between" category correlation. In still another implementation, a count exceeding a particular "significant" threshold may indicate that a keyword candidate is a significant search query term. A keyword candidate having a strong "within" category correlation, a weak "between" category correlation, and representing a significant search query term may be deemed a keyword for a particular category.

In still another implementation, keyword/category calculator 650 may use the counts determined by count accumulator 640 to calculate a score for each keyword candidate and category pair. For example, keyword/category calculator 650 may take into account both how likely a keyword is queried by search queries (e.g., is "sushi bar" queried more often than "shabu shabu"?) and how often a keyword (e.g., "sushi bar") is found in documents associated with particular categories (e.g., "Japanese restaurants"). Mathematically, keyword/category calculator 650 may define the sample space over which it computes statistics. For example, keyword/category calculator 650 may randomly select a search query that may be proportional to how often the search query is found in search queries 500 (e.g., "sushi bar" may be queried more often than "shabu shabu"). A search for the randomly selected search query may be performed over search queries 500 and documents and associated information 510 to determine any matches. The random selection of a search query and the search of the selected search query may be performed multiple times to generate a database of search queries (e.g., keyword candidates) and pairs of keyword candidates and associated document information.

Keyword/category calculator 650 may calculate a score for each keyword candidate and category pair using a variety of statistical methods (e.g., mutual information, entropy, Chi-squared tests, etc.). In one implementation, for example, keyword/category calculator 650 may perform a search over search queries 500 for all pairs that contain the keyword, and may perform a search over associated information 510 for all pairs that contain the category. Keyword/category calculator

650 may determine how well the second search compares with (e.g., determine the similarity) the first search based on how much overlap there is among the results returned by the searches. For example, keyword/category calculator 650 may determine a recall value "P(category|keyword)" and a precision value "P(keyword|category)" from the results returned by the searches. Keyword/category calculator 650 may retain keyword and category pairs with both good recall and precision.

Keyword/category calculator 650 may calculate a score, F-measure(keyword, category), for each pair according to the following equation:

$$F\text{-measure}(keyword, category) = P(keyword, category) / (a \cdot P(keyword) + (1-a) \cdot P(category))$$

where "a" may be a constant factor between "0" and "1"; "P(keyword)" is a probability of a keyword occurring in search queries 500 (e.g., "sushi bar" may have a frequency of five percent of search queries 500); "P(category)" is a probability of a category occurring in associated information 510 (e.g., "restaurants" may have a frequency of ten percent of associated information 510); and "P(keyword, category)" is the joint probability of a keyword and category pair occurring (e.g., "sushi bar" and "restaurants" may have a frequency of three percent). "P(category|keyword)" equals "P(keyword, category)/P(keyword)" and is the conditional probability of a category given a keyword. Keyword/category calculator 650 may keep results with the highest values (e.g., above a particular threshold) as keywords. If "a=1", then pure recall "P(category|keyword)" is being used, whereas, if "a=0", then pure precision "P(keyword|category)" is being used. Thus, "a" may be chosen for the best empirical performance (e.g., "a" may be almost but not equal to 1). Keyword/category calculator 650 may select as keywords those keywords having calculated scores exceeding the particular threshold. Alternatively, keyword/category calculator 650 may use the scores and derivatives in ranking documents (e.g., the score may be combined with other IR scores to affect the ordering of returned search results).

Table 1 (below) provides exemplary scores for exemplary categories and keywords. Keyword/category calculator 650 may use such scores to determine whether a keyword candidate may be deemed a keyword for a category. For example, keyword/category calculator 650 may provide particular score thresholds to determine whether a keyword candidate may be deemed a keyword for a category.

TABLE 1

Exemplary Keywords And Categories

| Category | Keyword | Score |
|---|---|---|
| attorneys | immigration lawyers | 0.5213 |
| attorneys | firms | 0.446 |
| attorneys | attorneys | 0.4337 |
| attorneys | immigration | 0.3725 |
| attorneys | lawyers | 0.353 |
| attorneys | attorney | 0.3408 |
| attorneys | lawyer | 0.3087 |
| attorneys | law offices | 0.291 |
| attorneys | district court | 0.2489 |
| attorneys | firm | 0.2432 |
| attorneys | law firm | 0.2417 |
| attorneys | bankruptcy | 0.2382 |
| attorneys | law firms | 0.2297 |
| attorneys | tax attorneys | 0.2158 |
| attorneys | bar association | 0.1978 |
| auto repair | auto repair | 0.2806 |
| auto repair | auto service | 0.2491 |
| auto repair | car repair | 0.2312 |
| auto repair | automotive repair | 0.1548 |
| auto repair | oil change | 0.143 |
| auto repair | repair | 0.142 |
| auto repair | truck repair | 0.1219 |
| auto repair | car service | 0.1218 |
| auto repair | brakes | 0.1152 |
| auto repair | parts | 0.1147 |
| auto repair | repair shops | 0.1133 |
| auto repair | engine repair | 0.1128 |
| auto repair | body repair | 0.111 |
| auto repair | body | 0.1036 |
| auto repair | jiffy lube | 0.1009 |
| beauty salons | hair salons | 0.6472 |
| beauty salons | beauty salons | 0.6369 |
| beauty salons | salons | 0.4578 |
| beauty salons | day spa | 0.4456 |
| beauty salons | hair salon | 0.435 |
| beauty salons | tanning salons | 0.4113 |
| beauty salons | salon | 0.3785 |
| beauty salons | day spas | 0.3651 |
| beauty salons | haircut | 0.3383 |
| beauty salons | beauty salon | 0.3109 |
| beauty salons | extensions | 0.2821 |
| beauty salons | haircuts | 0.2573 |
| beauty salons | nail salons | 0.248 |
| beauty salons | hair | 0.2418 |
| beauty salons | barber shops | 0.2258 |
| cocktail bars & lounges | night clubs | 0.0956 |
| cocktail bars & lounges | lounges | 0.0941 |
| cocktail bars & lounges | cocktail lounges | 0.0588 |
| cocktail bars & lounges | and clubs | 0.0401 |
| cocktail bars & lounges | sports bars | 0.0287 |
| cocktail bars & lounges | dance clubs | 0.0283 |
| cocktail bars & lounges | cocktail | 0.0271 |
| cocktail bars & lounges | restaurants & | 0.0267 |
| cocktail bars & lounges | pool tables | 0.0254 |
| cocktail bars & lounges | happy hour | 0.0213 |
| florist shops | flower shops | 0.3691 |
| florist shops | flower shop | 0.2893 |
| florist shops | category florists retail | 0.2864 |
| florist shops | florists | 0.2494 |
| florist shops | flower delivery | 0.2197 |
| florist shops | baskets | 0.2045 |
| florist shops | fruit baskets | 0.2 |
| florist shops | category florists | 0.1881 |
| florist shops | wedding flowers | 0.1845 |
| florist shops | orchids | 0.1826 |
| florist shops | balloons | 0.1679 |
| florist shops | floral | 0.1638 |
| florist shops | floral shops | 0.1447 |
| florist shops | cemeteries | 0.143 |
| florist shops | flower | 0.1348 |
| hardware | home hardware | 0.1057 |
| hardware | hardware stores | 0.0983 |
| hardware | true value | 0.0691 |
| hardware | handyman | 0.0586 |
| hardware | true value hardware | 0.0575 |
| hardware | ace hardware | 0.0503 |
| hardware | cabinet hardware | 0.0426 |
| hardware | hardware store | 0.0389 |
| hardware | building supply | 0.0377 |
| hardware | hardware | 0.0318 |
| hardware | grills | 0.0307 |
| hardware | mower | 0.0278 |
| hardware | kitchen cabinet | 0.0273 |
| hardware | improvement | 0.0272 |
| hardware | insulation | 0.0242 |
| pet kennels | pet boarding | 0.2125 |
| pet kennels | boarding kennels | 0.1523 |
| pet kennels | kennels | 0.1421 |
| pet kennels | cat boarding | 0.1083 |
| pet kennels | boarding | 0.1079 |
| pet kennels | kennel | 0.0946 |
| pet kennels | grooming | 0.0801 |
| pet kennels | sitting | 0.0743 |
| pet kennels | sitters | 0.0621 |

TABLE 1-continued

Exemplary Keywords And Categories

| Category | Keyword | Score |
|---|---|---|
| pet kennels | pet sitting | 0.0607 |
| pet kennels | cattery | 0.0479 |
| pet kennels | dog training | 0.0383 |
| pet kennels | pet care | 0.0358 |
| pet kennels | boarding kennel | 0.0252 |
| pet kennels | puppies | 0.0244 |
| physicians & surgeon | internal medicine | 0.2129 |
| physicians & surgeon | surgeons | 0.2059 |
| physicians & surgeon | family practice | 0.1945 |
| physicians & surgeon | physicians | 0.1838 |
| physicians & surgeon | pediatricians | 0.1813 |
| physicians & surgeon | dermatologists | 0.1679 |
| physicians & surgeon | md | 0.1606 |
| physicians & surgeon | medical clinics | 0.1562 |
| physicians & surgeon | ob gyn | 0.1547 |
| physicians & surgeon | physician | 0.1536 |
| physicians & surgeon | surgeon | 0.1529 |
| physicians & surgeon | pediatrics | 0.1455 |
| physicians & surgeon | dermatology | 0.1393 |
| physicians & surgeon | gynecology | 0.1371 |
| physicians & surgeon | gynecologists | 0.1365 |
| real estate | century 21 | 0.5141 |
| real estate | prudential real estate | 0.4926 |
| real estate | commercial real estate | 0.4923 |
| real estate | century 21 real estate | 0.4303 |
| real estate | prudential | 0.4164 |
| real estate | houses for sale | 0.4133 |
| real estate | agents | 0.4065 |
| real estate | realtor | 0.3976 |
| real estate | estate agent | 0.3695 |
| real estate | foreclosure | 0.359 |
| real estate | appraisal | 0.3521 |
| real estate | coldwell banker | 0.3234 |
| real estate | realtors | 0.3217 |
| real estate | real estate agent | 0.2922 |
| real estate | for sale | 0.2816 |
| restaurants | category restaurants | 0.6584 |
| restaurants | bakeries | 0.3629 |
| restaurants | fast food | 0.3057 |
| restaurants | seafood | 0.302 |
| restaurants | italian restaurants | 0.2955 |
| restaurants | sushi | 0.2914 |
| restaurants | restaurants | 0.2791 |
| restaurants | steak | 0.2772 |
| restaurants | chinese restaurants | 0.2633 |
| restaurants | ice cream | 0.2623 |
| restaurants | restaurant | 0.262 |
| restaurants | resturant | 0.2561 |
| restaurants | chinese restaurant | 0.252 |
| restaurants | dining | 0.2506 |
| restaurants | mexican | 0.2409 |
| restaurant chinese | chinese restaurants | 0.1623 |
| restaurant chinese | chinese restaurant | 0.1477 |
| restaurant chinese | chinese food | 0.0979 |
| restaurant chinese | china buffet | 0.0426 |
| restaurant chinese | chinese buffet | 0.0376 |
| restaurant chinese | china | 0.0213 |
| restaurant chinese | asian restaurants | 0.0208 |
| restaurant chinese | dim sum | 0.0206 |
| restaurant japanese | japanese restaurants | 0.0729 |
| restaurant japanese | hibachi | 0.0434 |
| restaurant japanese | teriyaki | 0.0337 |
| restaurant japanese | japanese food | 0.0299 |
| restaurant japanese | benihana | 0.0275 |
| restaurant japanese | japanese steak house | 0.0253 |
| restaurant japanese | wasabi | 0.0241 |
| restaurant japanese | japanese steakhouse | 0.0225 |
| restaurant japanese | sushi bar | 0.0222 |
| restaurant japanese | ichiban | 0.0213 |
| restaurant japanese | nobu | 0.0209 |
| restaurant japanese | asian restaurants | 0.0202 |

Keyword/category associator 660 may associate each identified keyword with documents from which the keyword was originally located and/or with other documents that contain the keyword and are labeled with the corresponding keyword category. For example, in one implementation, keyword/category associator 660 may associate the keyword "china buffet" with a document that contains "china buffet" and is labeled with the category "restaurant chinese."

Figure 7B:
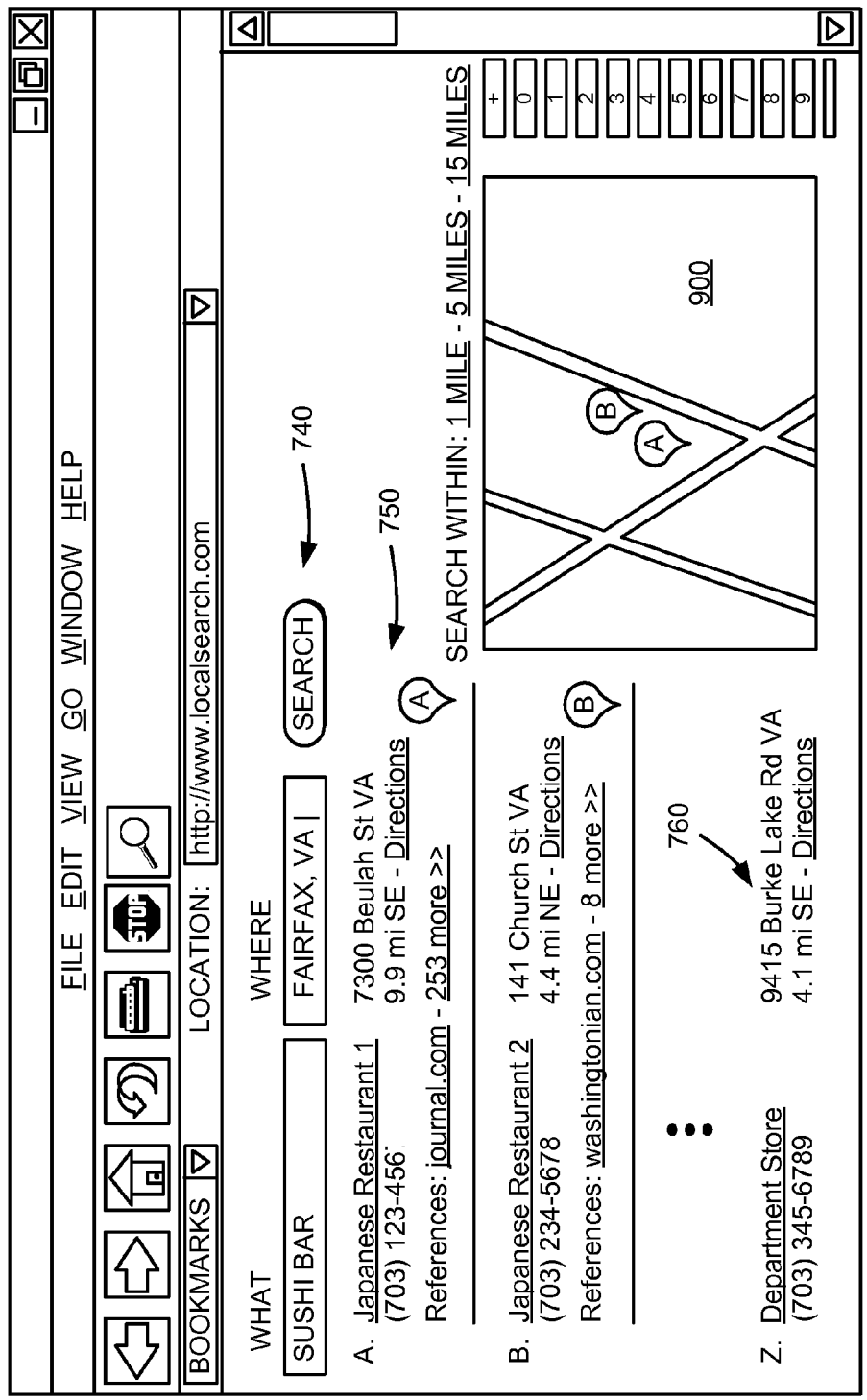
FIG. 7B is a diagram of exemplary search results created by the functional block diagram of FIG. 7A.

Once identified and associated with documents, the keywords may be used to improve information retrieval. In one implementation, if a search query includes an identified keyword, then documents labeled with the corresponding keyword category may be ranked higher than other documents. For example, as shown in FIG. 7A, documents 700 may be related to a category "Japanese restaurants." Keyword generating system 410 may generate the keyword "sushi bar" as related to documents 700. A search query 710 that contains the keyword "sushi bar" may be input to a search system 720, and search system 720 may rank documents 700 related to Japanese restaurants higher than documents related to department stores. The ranked documents (e.g., containing the higher ranked documents 700 first) may be outputted as search results 730. FIG. 7B provides a diagram of exemplary search results that may be provided. As shown, a search query 740 that contains the keyword "sushi bar" may generate search results 750 related to Japanese restaurants that may be ranked higher than search results 760 related to department stores.

In another example, a document that has a "sushi bar" match on it may be labeled as having the keyword "sushi bar" if the document contains information relating to a Japanese restaurant, but not if the document contains information relating to a department store.

In another implementation, the keywords may be searched when a search query is entered to improve information retrieval. Keyword generating system 410 may store the keywords so that when documents are later identified as relevant to a search query by a search engine, the ranks of the documents based on keywords may be quickly determined. Since user behavior data is constantly changing (e.g., a keyword may no longer be used), keyword generating system 410 may periodically update the scores assigned to the keywords and, thus, the ranks of the documents. In such an implementation, keyword generating system 410 may consider the age of the search queries (e.g., stored in repository 400) when determining the keyword candidates.

Although exemplary implementations show creation of pairs of keyword candidates and associated document information, and mapping of the document information to categories to obtain pairs of keyword candidates and categories, in other implementations, pairs of keyword candidates and categories may be created without the need for creating keyword candidate and document information pairs, and mapping of the document information to categories.

Exemplary Processes

FIG. 8 is a flowchart of an exemplary process for generating keywords associated with document categories. FIG. 9 is a flowchart of an exemplary process for presenting search results based on associated keywords and categories. In one implementation, server 220 may perform most, if not all, of the acts described with regard to the processing of FIGS. 8 and 9. In another implementation, one or more, or all, of the acts may be performed by another entity, such as another server 230 and/or 240 or client 210.

Exemplary Keyword Generation Process

As shown in FIG. 8, a process 800 for generating keywords associated with document categories may begin with the storing of information, such as user behavior data, in repository 400. As described above, documents maintained by servers connected to a network or a combination of networks, such as the Internet, may be crawled and indexed. User behavior data may also be determined for all or a subset of the documents. The user behavior data may include, for example, information concerning users who accessed the documents, such as navigational actions of the users (e.g., what links the users selected (e.g., topics and/or categories associated with these links), how many times a link(s) is selected, addresses entered by the users, forms completed by the users, etc.), the language of the users, interests of the users, query terms entered by the users, etc.

As shown in FIG. 8, process 800 may extract keyword candidates based on search queries and associated document information (block 810). For example, in one implementation described above in connection with FIG. 6, keyword candidate extractor 600 may extract keyword candidates from search queries 500 and associated information 510 provided in repository 400. In one example, a keyword candidate may include a word or phrase used by a local search user as a query (e.g., stored in search queries), and found in one or more documents associated with a particular business listing (e.g., by identifying the name, address, and/or telephone number of the business in a document).

Process 800 may create pairs of keyword candidates and document information (block 820). For example, in one implementation described above in connection with FIG. 6, pair creator 610 may create pairs of keyword candidates and associated document information, where each pair may include a keyword candidate and corresponding document information. In one example, pair creator 610 may create a pair that includes a keyword candidate (e.g., "law offices") and its associated document information (e.g., a business name "Law Offices of Jane Doe LLP").

As further shown in FIG. 8, process 800 may calculate the search query frequencies of the keyword candidates (block 830). For example, in one implementation described above in connection with FIG. 6, frequency calculator 620 may calculate the frequency that each keyword candidate occurs in search queries stored in repository 400. In one example, frequency calculator 620 may calculate the number of times (i.e., the frequency) that "law offices" appears in search queries stored repository 400.

Process 800 may calculate the frequencies that the keyword candidate and document information pairs occur in documents (block 840). For example, in one implementation described above in connection with FIG. 6, frequency calculator 620 may calculate the frequency that each keyword candidate and document information pair occurs in documents stored in repository 400. In one example, frequency calculator 620 may determine the number of times a keyword candidate (e.g., "law offices") and its associated document information (e.g., "Law Offices of Jane Doe LLP") appears in documents stored in repository 400.

As further shown in FIG. 8, process 800 may map document information to document categories (block 850). For example, in one implementation described above in connection with FIG. 6, information-to-category mapper 630 may map (or correlate) document information with document categories. Information-to-category mapper 630 may create pairs of keyword candidates and document categories, where each pair may include a keyword candidate and its corresponding document category.

Process 800 may determine keywords for document categories (block 860). For example, in one implementation described above in connection with FIG. 6, keyword/category calculator 650 may perform statistical analyses on the counts determined by count accumulator 640 to determine whether a keyword candidate may have a strong "within" category correlation, may have a weak "between" category correlation, and/or may represent a significant search query term. A keyword candidate having a strong "within" category correlation, a weak "between" category correlation, and representing a significant search query term may be deemed a keyword for a particular category. In another example, keyword/category calculator 650 may use the counts determined by count accumulator 640 to calculate a score for each keyword and category pair, as described above. Keyword/category calculator 650 may use such scores to determine whether a keyword candidate may be deemed a keyword for a category.

As further shown in FIG. 8, process 800 may associate keywords with documents (block 870). For example, in one implementation described above in connection with FIG. 6, keyword/category associator 660 may associate each identified keyword with documents from which the keyword was originally located and/or with other documents that contain the keyword and are labeled with the corresponding keyword category.

Exemplary Search Results Presentation Process

As shown in FIG. 9, a process 900 for presenting search results may begin with a user providing search terms as a search query for searching a document corpus. In one implementation, the document corpus may include documents available from the Internet and the vehicle for searching this corpus is a search engine (e.g., provided on server 220). The user may provide the search query via web browser software on a client, such as client 210 (FIG. 2).

As further shown in FIG. 9, the search query may be received by the search engine (block 910) and used to identify documents related to the search query (block 920). A number of techniques may be used for identifying documents related to a search query. For example, in one implementation, documents may be identified that contain the search terms as a phrase. In another implementation, documents that contain the search terms, but not necessarily together, may be identified. In still another implementation, documents that contain less than all of the search terms, or synonyms of the search terms, may be identified. Alternatively, or additionally, a combination(s) of the aforementioned techniques may be used.

As further shown in FIG. 9, process 900 may determine if a search query contains a keyword (block 930). For example, in one implementation, the search engine may determine whether the search query contains terms that match keywords generated by keyword generating system 410. Process 900 may determine if the identified documents are associated with the keyword and/or a category (block 940). For example, in one implementation, the search engine may determine whether the identified documents are labeled with a document category associated with the keyword.

Process 900 may determine the ranks for the identified documents based on the keywords and the keyword categories (block 950). For example, in one implementation, document ranks may be pre-calculated and determining the ranks of the documents may include looking up the document ranks. In another implementation, the document ranks may not be pre-calculated. In this case, the ranks of the documents may be determined based on the keywords and keyword categories. For example, in one implementation described above in connection with FIGS. 7A and 7B, a search query that contains the keyword "sushi bar" may generate search results 750 related to Japanese restaurants (e.g., keyword category) that may be ranked higher than search results 760 related to department stores (e.g., unrelated category).

As further shown in FIG. 9, process 900 may sort the documents based on their ranks (block 960). In practice, however, a document's rank may be one of several factors used to determine an overall rank for the document. The documents may be sorted based on their overall ranks.

Process 900 may generate search results based on the sorted documents (block 970). For example, in one implementation, the search results may include representations (e.g., links, snippets, etc.) associated with the documents. In another implementation, the search results may include the documents themselves. In yet other implementations, a number of top ranking documents may be included in the search results. In still another implementation, documents with ranks under a particular threshold may be discarded and the remaining documents may be included in the search results. In another implementation, the search results may include documents related to a keyword and/or a category. In a further implementation, a combination(s) of the aforementioned techniques for forming the search results may be used.

The search results may be provided as a HTML document, similar to search results typically provided by search engines. Alternatively, the search results may be provided according to a protocol agreed upon by the search engine and the client (e.g., Extensible Markup Language (XML)).

CONCLUSION

Implementations described herein may provide a system for generating keywords associated with document categories. In one implementation, the system may determine keyword candidates from a corpus of documents, and may create keyword candidates and document information pairs from the determined keyword candidates. The frequencies of the keyword candidates and the pairs may be determined by the system. The system may map the document information to document categories to create pairs of keyword candidates and document categories. The keywords associated with document categories may be determined by system. The system may associate each identified keyword with documents in which it is located, and/or with other documents that contain the keyword and the document category associated with the keyword. The identified keywords may used when a search query is entered to improve information retrieval.

Once identified and associated with documents, the keywords may be used to improve information retrieval. For example, in one implementation, if a search query includes an identified keyword, then documents labeled with the corresponding keyword category may be ranked higher than other documents.

The foregoing description of the present invention provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 9, the order of the blocks may be modified in other implementations consistent with principles of the invention. Further, non-dependent blocks may be performed in parallel.

It will be apparent to one of ordinary skill in the art that aspects described herein may be implemented in many different forms of software, firmware, and hardware in the implementations illustrated in the figures. The actual software code or specialized control hardware used to implement aspects described herein is not limiting. Thus, the operation and behavior of the aspects were described without reference to the specific software code—it being understood that one of ordinary skill in the art would be able to design software and control hardware to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, by one or more processors and as a keyword candidate, a first word included in one or more of previously submitted queries;
   creating, by the one or more processor, a pair that includes the first word and a second word that differs from the first word,
      the second word being descriptive of a particular category of a plurality of categories;
   calculating, by the one or more processors, a first value based on a first frequency that the first word appears in the previously submitted queries;
   calculating, by the one or more processors, a second value based on occurrences of the pair in a collection of documents,
      one or more documents, in the collection of documents, being classified in the particular category based on occurrences of the second word in the one or more documents, and
      the second value being calculated based on a second frequency that the first word appears in the one or more documents classified in the particular category;
   determining, by the one or more processors and based on the first value, that the first value satisfies a first threshold;
   determining, by the one or more processors and based on the second value, that the second value satisfies a second threshold;
   determining, by the one or more processors, that the first word is a keyword for the particular category based on the first value satisfying the first threshold and the second value satisfying the second threshold; and
   associating, by the one or more processors, the first word with the one or more documents based on determining that the first word is the keyword for the particular category.

2. The method of claim 1, where associating the first word with the one or more documents includes:
   indexing the one or more documents to include a reference to the first word.

3. The method of claim 1, where identifying the first word includes:
   identifying the first word when at least a particular number of user selections of search results, responsive to the one or more of the previously submitted queries, relate to the particular category.

4. The method of claim 1, where determining that the first word is the keyword for the particular category further includes:

calculating a third value based on a third frequency that the first word appears in the collection of documents; and determining that the first word is the keyword for the particular category further based on determining that the third value does not satisfy a third threshold.

5. The method of claim 1, where determining that the first word is the keyword for the particular category further includes:

determining a score for the first word; and determining that the first word is the keyword for the particular category further based on determining that the score satisfies a score threshold.

6. The method of claim 5, where the score for the first word is based on a third value associated with a third frequency that the first word appears in the collection of documents.

7. The method of claim 1, further comprising:

receiving a search query that includes a form of the first word; and increasing, in an ordered list of documents associated with the search query, a ranking of a document associated with the particular category.

8. The method of claim 7, where the ordered list of documents includes search results, and where the method further includes:

outputting the search results after increasing the ranking of the document.

9. A non-transitory computer-readable medium storing instructions that are executable by one or more processors, the instructions comprising:

one or more instructions to identify, as a keyword candidate, a first word included in one or more of previously submitted queries;

one or more instructions to create a pair that includes the first word and a second word that differs from the first word, the second word being descriptive of a particular category of a plurality of categories;

one or more instructions to calculate a first value based on a first frequency that the first word appears in the previously submitted queries;

one or more instructions to calculate a second value based on occurrences of the pair in a collection of documents, one or more documents, in the collection of documents, being classified in the particular category based on occurrences of the second word in the one or more documents, and the second value being calculated based on a second frequency that the first word appears in the one or more documents classified in the particular category;

one or more instructions to determine, based on the first value, that the first value satisfies a first threshold;

one or more instructions to determine, based on the second value, that the second value satisfies a second threshold;

one or more instructions to determine that the first word is a keyword for the particular category based on the first value satisfying the first threshold and the second value satisfying the second threshold; and one or more instructions to associate the first word with the one or more documents based on determining that the first word is the keyword for the particular category.

10. The non-transitory computer-readable medium of claim 9, where the one or more instructions to associate the first word with the one or more documents include:

one or more instructions to index the one or more documents to include a reference to the first word.

11. The non-transitory computer-readable medium of claim 9, where the one or more instructions to identify the first word include:

one or more instructions to identify the first word when at least a particular number of user selections of search results, responsive to the one or more of the previously submitted queries, relate to the particular category.

12. The non-transitory computer-readable medium of claim 9, where the instructions further comprise:

one or more instructions to calculate a third value based on a third frequency that the first word appears in the collection of documents, and where the one or more instructions to determine that the first word is the keyword for the particular category include:

one or more instructions to determine that the first word is the keyword for the particular category further based on the third value not satisfying a third threshold.

13. The non-transitory computer-readable medium of claim 9, where the one or more instructions to determine that the first word is the keyword for the particular category include:

one or more instructions to determine a score for the first word, and one or more instructions to determine that the first word is a keyword for the particular category further based on the score satisfying a score threshold.

14. The non-transitory computer-readable medium of claim 13, where the score for the first word is based on a third value associated with a third frequency that first word appears in the collection of documents.

15. The non-transitory computer-readable medium of claim 9, where the instructions further comprise:

one or more instructions to receive a search query that includes a form of the first word; and one or more instructions to increase, in an ordered list of documents associated with the search query, a ranking of a document associated with the particular category, and where the ordered list of documents includes search results.

16. A system comprising:

a memory to store a plurality of instructions; and a processor to execute the plurality of instructions in the memory to:

identify, as a keyword candidate, a first word included in one or more of previously submitted queries, calculate a first value based on a first frequency that the first word appears in the previously submitted queries, create a pair that includes the first word and a second word that differs from the first word, the second word being descriptive of a particular category of a plurality of categories, calculate a second value based on occurrences of the pair in a collection of documents, one or more documents, in the collection of documents, being classified in the particular category based on occurrences of the second word in the one or more documents, and the second value being calculated based on a second frequency that the first word appears in the one or more documents classified in the particular category, determine, based on the first value, that the first value satisfies a first threshold;

determine, based on the second value, that the second value satisfies a second threshold, determine, based on the first value satisfying the first threshold and the second value satisfying the second threshold, that the first word is a keyword for the particular category, and store information associating the first word with the one or more documents, associated with the particular category, based on determining that the first word is the keyword for the particular category.

17. The system of claim 16, where the processor, when associating the first word with the document, is further to:

index the one or more documents to include a reference to the first word.

18. The system of claim 16, where the processor, when identifying the first word, is further to:

identify the first word when at least a particular number of user selections of search results, responsive to the one or more of the previously submitted queries, relate to the particular category.

19. The system of claim 16 where the processor is further to:

calculate a third value based on a third frequency that the first word appears in the collection of documents, and where the processor, when determining that the first word is the keyword for the particular category, is further to:

determine that the first word is the keyword for the particular category further based on the third value not satisfying a third threshold.

20. The system of claim 16, where the processor, when determining that the first word is a keyword for the particular category, is further to:

determine a score for the first word, and determine that the first word is the keyword for the particular category further based on the score satisfying a score threshold.

21. The system of claim 20, where the score for the first word is based on a third value associated with a third frequency that the first word appears in the collection of documents.

22. The system of claim 16, where the processor is further to:

receive a search query that includes a form of the first word, and increase, in an ordered list of documents associated with the search query, a ranking of a document associated with the particular category, and where the ordered list of documents includes search results.

23. The system of claim 22, where the processor, when increasing the ranking of the document, is further to:

organize the search results, associated with the search query, based on increasing the ranking of the document associated with the particular category.

\* \* \* \* \*